US010627824B2

(12) United States Patent
Runde et al.

(10) Patent No.: US 10,627,824 B2
(45) Date of Patent: Apr. 21, 2020

(54) AUTOMATIC GROUND SPEED CONTROL SYSTEM FOR A WORK VEHICLE

(71) Applicant: DEERE & COMPANY, Moline, IL (US)

(72) Inventors: Jeffrey E. Runde, Cedar Falls, IA (US); Qiang R. Liu, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 86 days.

(21) Appl. No.: 15/634,089

(22) Filed: Jun. 27, 2017

(65) Prior Publication Data

US 2018/0373257 A1 Dec. 27, 2018

(51) Int. Cl.
  *G05D 1/02* (2020.01)
  *A01B 69/00* (2006.01)
  *A01B 69/04* (2006.01)

(52) U.S. Cl.
  CPC ......... *G05D 1/0223* (2013.01); *A01B 69/007* (2013.01); *A01B 69/008* (2013.01);
  (Continued)

(58) Field of Classification Search
  CPC ........... B60W 30/1882; B60W 10/184; B60W 2520/125; B60W 2520/14;
  (Continued)

(56) References Cited

U.S. PATENT DOCUMENTS 6,009,367 A * 12/1999 Hori ..................... B60K 31/107
123/350
6,128,574 A * 10/2000 Diekhans ............. A01B 79/005
701/410

(Continued)

FOREIGN PATENT DOCUMENTS

DE 19629618 A1 1/1998
DE 10 2013 221 948 A1 4/2014

OTHER PUBLICATIONS

Towards Agrobots: Trajectory; Control of an Autonomous;Tractor;Using Type-2 Fuzzy Logic Controllers; Erdal Kayacan ; Erkan Kayacan; Herman Ramon; Okyay Kaynak ; Wouter Saeys; IEEE/ASME Transactions on Mechatronics; vol. 20.*

(Continued)

*Primary Examiner* — Cuong H Nguyen
(74) *Attorney, Agent, or Firm* — Taft Stettinius & Hollister LLP; Stephen F. Rost (57) ABSTRACT

A method and apparatus for automatically controlling ground speed of a work vehicle. The apparatus includes a speed sensor generating a vehicle speed signal, the speed sensor operatively connected to a controller. A traction device angle sensor generates an angle signal which represents an angle of the traction device with respect to an axis of the work vehicle, wherein the traction device angle sensor operatively connected to the controller. A vehicle guidance system is configured to generate a vehicle position signal, wherein the controller determines the ground speed of the vehicle based on at least one of: i) a tracking error of the (Continued)

vehicle relative to the vehicle position signal; ii) a planned curved vehicle path; iii) a planned location of the vehicle within a defined portion of a field; and iv) a planned path segment and an associated change in direction of travel of the work vehicle.

20 Claims, 8 Drawing Sheets

(52) U.S. Cl.
CPC ......... *G05D 1/0219* (2013.01); *G05D 1/0274* (2013.01); *G05D 1/0278* (2013.01); *G05D 2201/0201* (2013.01)

(58) Field of Classification Search
CPC ..... B60W 2520/402; B60W 2710/125; B60W 30/1884; B60W 10/06; B60W 2710/10; B60W 2720/406; B60W 2710/0666; B60W 2710/1005
USPC ................................ 701/50–51, 93; 303/123
See application file for complete search history.

(56) References Cited

U.S. PATENT DOCUMENTS

| 8,789,644 | B2* | 7/2014 | Shirao | B60W 10/06 180/306 |
| 8,862,357 | B2* | 10/2014 | Miyata | B60W 10/06 303/123 |
| 9,020,697 | B2* | 4/2015 | Ricci | A61B 5/4809 701/36 |
| 9,150,104 | B2 | 10/2015 | Kellum | |
| 9,717,171 | B2 | 8/2017 | Redden et al. | |
| 2004/0249543 | A1* | 12/2004 | Kilworth | B60W 10/06 701/54 |
| 2010/0174456 | A1* | 7/2010 | Beaudoin | B60W 10/06 701/51 |
| 2013/0261919 | A1* | 10/2013 | Miyata | B60W 10/06 701/70 |
| 2014/0121931 | A1* | 5/2014 | Kellum | B60K 28/10 701/93 |
| 2014/0309806 | A1* | 10/2014 | Ricci | B60R 25/1004 701/1 |
| 2014/0309870 | A1* | 10/2014 | Ricci | B60W 50/14 701/36 |
| 2014/0309880 | A1* | 10/2014 | Ricci | G06F 16/583 701/36 |
| 2014/0309886 | A1* | 10/2014 | Ricci | B60W 50/10 701/41 |
| 2014/0309891 | A1* | 10/2014 | Ricci | B60R 25/20 701/48 |
| 2015/0232065 | A1* | 8/2015 | Ricci | H04W 4/21 701/36 |

OTHER PUBLICATIONS

Autonomous maneuvers of a robotic tractor for farming; Hao Wang ; Noboru Noguchi; 2016 IEEE/SICE International Symposium on System Integration (SII); pp. 592-597; IEEE Conferences; year 2016.*
Motion planning for autonomous landmine detection and clearance robot; Ibrahim A. Hameed; 2016 International Workshop on Recent Advances in Robotics and Sensor Technology for Humanitarian Demining and Counter—IEDs (RST); pp. 1-5; IEEE Conferences; year 2016.*
German Search Report, German Patent and Trademark Office, German Application Ser. No. 10 2018 210514.6, dated Nov. 23, 2018, pp. 1-12.

* cited by examiner

AUTOMATIC GROUND SPEED CONTROL SYSTEM FOR A WORK VEHICLE

FIELD OF THE DISCLOSURE

The present invention generally relates to a control system for a work vehicle, and more particularly to a speed control system to control the ground speed of a tractor.

BACKGROUND

Work vehicles are configured to perform a wide variety of tasks for use as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field at a designated speed. Tractors often include a power takeoff (PTO) which includes a shaft coupled to the transmission and driven by the engine to power an implement being pulled or pushed through a field by the tractor.

Tractors can be steered through a field by a manual command provided by an operator through a manually controlled steering device such as a steering wheel or joystick, or by an automatic steering command. In the case of an automatic steering command, a steering control signal can be provided by a global positioning system (GPS) signal. Steering control systems often include one or more sensors configured to sense a position of the steering device or a position of the wheels with respect to a frame of the vehicle.

The speed of the tractor can also be controlled either manually or automatically as is known by those skilled in the art. Vehicle speed, when manually controlled, is adjusted through the use of an accelerator that is adjusted by a foot pedal or hand device. One type of automatic speed control is also known as "cruise control".

In some tractors, the vehicle direction is also controlled by a vehicle direction control signal provided by the GPS signal to adjust the vehicle direction. Many agriculture tractors manufactured today include an on-board ability to automatically control the direction of the wheels of the tractor independently of the operator's steering wheel input. This capability paired with a position receiver and a guidance display automatically steers the tractor down a defined path in the field.

Such integrated guidance systems are configured to maintain the tractor and the implement, if included, on a fairly straight line path, without curving or deviating, by adjusting the direction of the steered wheels of the tractor only. These systems, however, struggle with maintaining direction along the defined path when the path's curvature approaches the tractor's minimum turning radius. At higher ground speeds, the tractor's turning radius gets larger. If the tractor's ground speed is not slowed as it encounters areas on the planned path with tight curvature segments, then the tractor tends to overdrive the path segment. This leads to a large path lateral tracking error and unacceptable guidance performance.

Generally the tractor needs to slow down to make a tight, space constrained, turn at the end of the field path. If the tractor does not slow sufficiently, the minimum radius the tractor can reliably guide itself will exceed the allotted space to actually make the turn. This forces the operator to manually slow the tractor down and then speed it up after the turn. Generally, the segments of the planned path with the tightest curvature segments tend to be around an end of row turn, but can also be encountered in the middle of a field with a curved path segment.

What is needed therefore is a speed control system that is configured to adjust ground speed of a vehicle based on the path being traveled.

SUMMARY

An automatic vehicle ground speed method and apparatus for a work vehicle is disclosed to control a wheel speed command based on a steering guidance command provided by a guidance control system, such as a GPS system.

The present disclosure utilizes a software based process or algorithm using programmed instructions and a user interface accessible to the work vehicle operator. A vehicle's ground speed is managed in parallel with a vehicle guidance system configured to move the work vehicle along predetermined path located in a field at a guided speed. While a tractor is depicted, the present disclosure is not limited to tractors, but is applicable for use with different types of powered work vehicles including, but not limited, to a combine harvester, a sprayer, a cotton harvester or cotton picker.

In a system having a guidance control lacking speed control, when the powered vehicle is in a Forward or Reverse motion mode, the vehicle attempts to reach and maintain its operator selected wheel set speed when not at full engine load or limited by another application. Generally the vehicle's ground speed is then equal to current wheel speed*(1−wheel slip %).

The objective of this disclosure is to determine if the current vehicle wheel speed needs to be limited based on one or more of four parts as follows: i) wheel speed limiting algorithm that takes as input a current lateral path tracking error of the vehicle relative to its desired path; ii) a wheel speed limiting algorithm that takes as input a curvature of the upcoming planned path segments; iii) a wheel speed limiting algorithm that takes as input a current location of the tractor and implement in the field and limits to the operator defined speed limit for that area; and iv) a wheel speed limiting algorithm that takes as input an upcoming planned path segments and their associated direction of travel.

The requested speed output of the described control system, in one embodiment, provides a lesser value of the one of, some of, or all of the vehicle wheel speed limits to determine a vehicle speed. The determined work vehicle wheel speed limit is then applied to the vehicle's current wheel speed command if the speed limit is less than the current operator selected wheel set speed. This wheel speed command causes the vehicle to slow down to the new speed limit.

In one embodiment of the disclosure, there is provided an automatic ground speed control system for a work vehicle having a steerable wheel, a prime mover supplying torque to a ground engaging traction device, and an electronic control unit (ECU). The control system includes a speed sensor generating a vehicle speed signal, wherein the speed sensor is operatively connected to the ECU, and a traction device angle sensor. The angle sensor generates an angle signal which represents an angle of the traction device with respect to an axis of the work vehicle, wherein the traction device angle sensor is operatively connected to the ECU. A vehicle guidance system generates a vehicle position signal, wherein the ECU determines a direction of the vehicle position signal and further determines a ground speed of the work vehicle based on the direction of the work vehicle.

In another embodiment, there is provided an automatic ground speed control system for a work vehicle having a steerable wheel and a prime mover supplying torque to a ground engaging traction device. The control system includes a speed sensor generating a vehicle speed signal, a traction device angle sensor generating an angle signal which represents an angle of the traction device with respect to an axis of the work vehicle, a vehicle guidance system generating a vehicle position signal, and a user interface device configured to receive one or more input values provided by an operator. Control circuitry is operatively connected to the speed sensor, the traction device angle sensor, the vehicle guidance system, and the user interface device, wherein the control circuitry includes a processor and a memory. The memory is configured to store program instructions and the processor is configured to execute the stored program instructions to: i) determine the input value received by the user interface device; and ii) determine a ground speed of the work vehicle based on a determined direction of the work vehicle and the determined input value.

In still another embodiment, there is provided a method of automatically controlling the ground speed of a work vehicle moving through a field having a working area and a headland area. The method includes: i) moving the vehicle at a defined ground speed along a vehicle track located in the working area; ii) reducing the defined speed based on a deviation of the work vehicle from the vehicle track when the deviation exceeds a predefined lateral error threshold; iii) moving the vehicle along a curved path defined in the headland area; and iv) reducing the defined ground speed based on a predefined curvature threshold value when the defined ground speed exceeds the predefined curvature threshold value.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
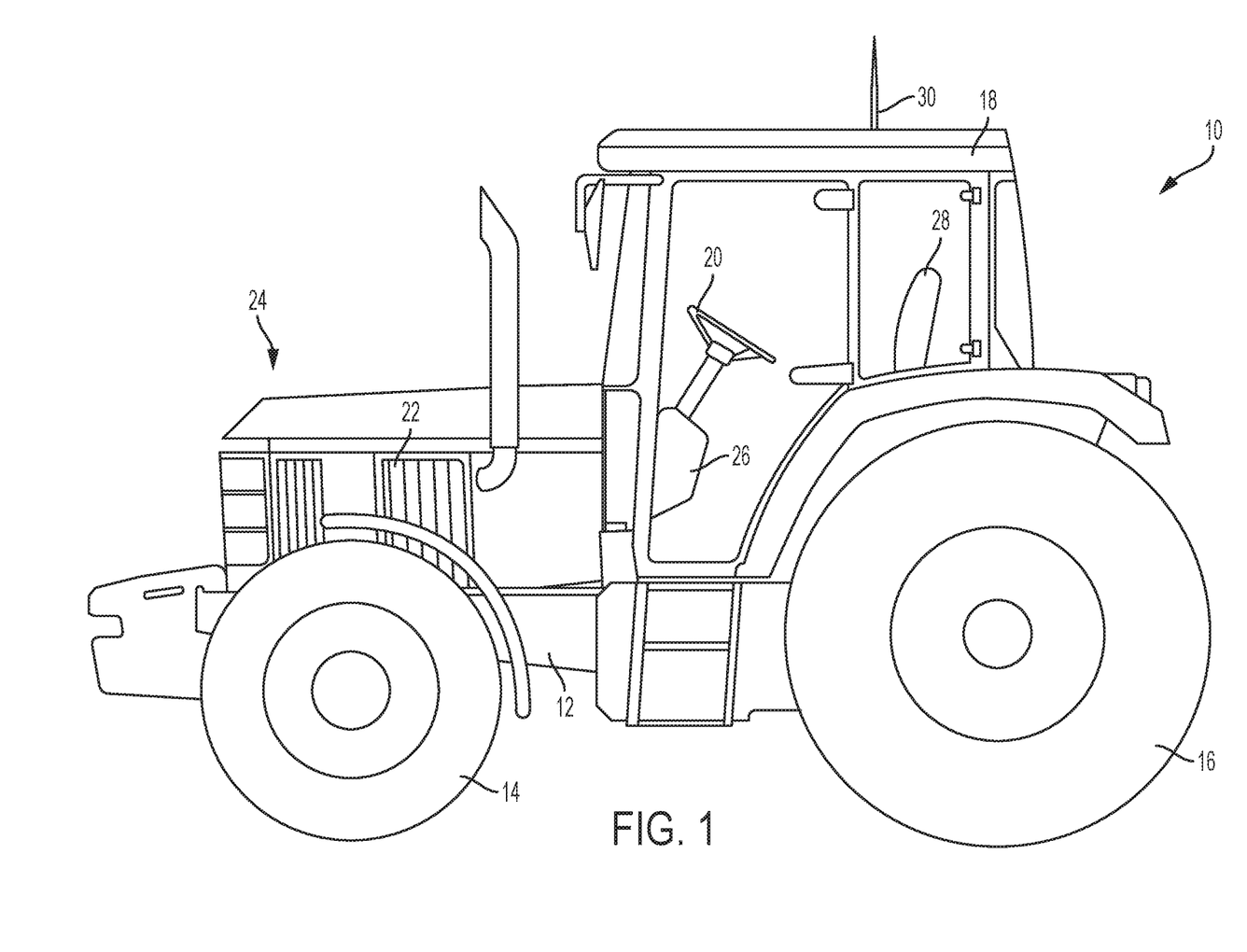
FIG. 1 is a side elevational view of a work vehicle, and more specifically, of an agricultural vehicle such as a tractor.

FIG. 1 is an elevational side view of an agricultural vehicle, and more particularly a tractor 10, including a frame 12 supported on a pair of front wheels 14 and a set of rear wheels 16. While wheels are described in the embodiments, other ground engaging traction devices, including treads, are contemplated. An operator cab 18 is mounted on the frame 12 and contains various controls for the vehicle 10 so as to be within the reach of a seated or standing operator. In one aspect, these controls may include a steering wheel 20. A prime mover 22, such as an engine, is mounted on the frame 12 beneath a housing 24 and supplies power for driven components of the tractor 10. The engine 22, for example, is configured to drive a transmission (not shown), which is coupled to drive the front wheels 14 at various selected speeds and either in forward or reverse modes. In other embodiments, the rear set of wheels is driven to move the tractor, or all of the wheels are driven in an all-wheel drive mode to move the tractor 10.

While the described embodiments are discussed with reference to a tractor, in addition to addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cab 18 also encloses a seat 28 for seating the operator. The operator workstation 26, in different embodiments, includes one or more of an operator user interface, a steering wheel, a joystick, an accelerator pedal, and a power take-off (PTO) control device for turning on or off the PTO. Pedals for a brake and a clutch are also located in the cabin 18, but are not shown.

The user interface includes a plurality of operator selectable buttons configured to enable the operator to control the operations and functions of the tractor 10. The user interface, in one embodiment, includes a user interface device including a display screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons. A communication antenna 30 is supported by the cab 18 and provides for the transmission and reception of signals transmitted through the air. In one embodiment, the communication antenna 30 is a GPS antenna configured to receive and to send global positioning data to and from a GPS satellite as is known by those skilled in the art.

Figure 2:
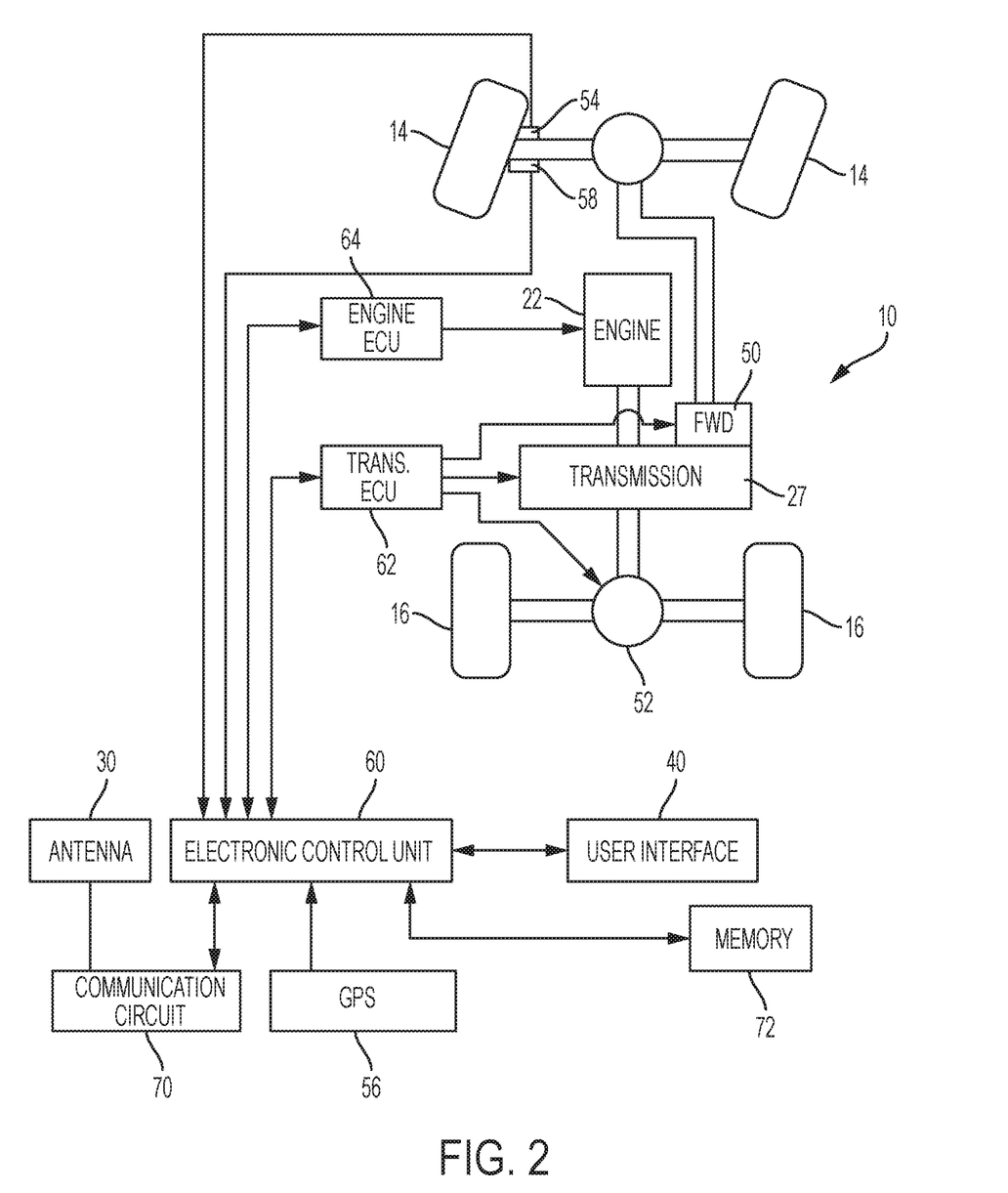
FIG. 2 is a simplified schematic diagram of an electro-hydraulic control system for a work vehicle having steerable wheels.

FIG. 2 is a simplified schematic diagram of the vehicle 10 and a control system embodying the invention. A transmission 27 includes an electronically controlled front wheel drive control unit 50 and an electronically controlled differential lock control unit 52. The front wheel drive control unit 50 is coupled to the steerable front wheels 14. When the front wheel drive control unit 50 is on, torque is transmitted from the transmission 27 to the front wheels 14. When the front wheel drive control unit 50 is off, torque is not transmitted from the transmission to the front wheels 14.

The differential lock control unit 52 is coupled to the driven rear wheels 16. When the differential lock control unit 52 is unlocked (off, open differential), it allows each of the rear wheels 16 to rotate at different speeds, such as when negotiating a turn. By contrast, when the differential lock control unit 52 is on or locked, it forces both left and right wheels on the same axle to rotate at the same speed under nearly all circumstances.

A wheel angle sensor 54 senses the angular position of the wheels 14. A guidance computer 56, which in different embodiments includes different types of guidance computers including GPS unit, provides a vehicle position signal. A wheel speed sensor 58 provides a wheel speed signal. While different embodiments implement different types of guidance computers, the present disclosure describes the automatic ground speed control system with respect to a GPS system. The present disclosure is not, however, limited to a GPS system and other guidance systems are contemplated.

A main electronic control unit (ECU) 60 is connected to the wheel angle sensor 54, the GPS unit 56, and the wheel speed sensor 58. The ECU 60 communicates with a transmission ECU 62 and with an engine ECU 64.

Transmission ECU 62 controls the transmission 27 and provides control signals to the front wheel drive control unit 50 and to the differential lock control unit 52. The engine ECU 64 controls the engine 18. A user interface device 40 is connected to the main ECU 60. The GPS unit 56 is a conventional GPS unit. In one embodiment, the GPS unit 56 is configured to locate the position of the tractor 10 within a field.

A communication circuit 70 is coupled to the ECU 60 and to the antenna 30. The communication circuit 70 is configured to transmit signals generated by the ECU 60, which in some applications have been generated in response to information submitted by an operator through the user interface 40, located in the cab 18. The communication circuit 70 is further configured to receive signals from the antenna 30. A memory 72 is operatively coupled to the ECU 60 and is configured to store information. In some embodiments, the communication circuit 70 is used for internal communication among devices or circuits located in the vehicle.

The ECU 60, in different embodiments, includes a computer, computer system, control circuitry, or a programmable device, e.g., multi-user or single-user computers. In other embodiments, the ECU 60 includes one or more processors (e.g. microprocessors), and the associated internal memory including random access memory (RAM) devices comprising the memory storage of the ECU 60, as well as any supplemental levels of memory, e.g., cache memories, non-volatile or backup memories (e.g. programmable or flash memories), read-only memories, etc. In addition, the memory can include a memory storage physically located elsewhere from the processing devices and can include any cache memory in a processing device, as well as any storage capacity used as a virtual memory, e.g., as stored on a mass storage device or another computer coupled to ECU 60 view the communication circuit 70. The mass storage device can include a cache or other dataspace which can include databases. In addition to or in place of the internal memory, a memory 72 is operatively coupled to the ECU 60 and is configured to store information. Each of the transmission ECU 62 and engine ECU 64, in different embodiments, includes the above described components and features.

The automatic vehicle ground speed control system automatically and continually generates an optimized vehicle ground speed command based on the vehicle's current lateral tracking error relative to the vehicle's planned path, the vehicle's upcoming path segment curvature values, and the vehicle's current location in the field. More specifically, the vehicle operates according to an automatic vehicle control responsive to operator inputs to the ECU 60, which is programmed to process program instructions stored in the memory 72 or other accessible memory. In one embodiment, the programmed instructions provide not only a closed loop vehicle guidance of the tractor, but also provide a closed loop vehicle ground speed control at the same time. In other embodiments, the described closed loop vehicle ground speed control system works in concert with preexisting closed loop vehicle guidance systems. By providing vehicle ground speed control, the operator is relieved from having to continuously manage the vehicle's ground speed to stay on a desired path. Instead the operator determines a maximum ground speed for the vehicle. In one embodiment, the programmed instructions maintain a vehicle at the operator's desired maximum ground speed whenever possible, but reduce the vehicle's ground speed automatically if the vehicle starts to get off path (reactive) or if the upcoming segments in the vehicle's planned path have tight curvature values (proactive).

Figure 3:
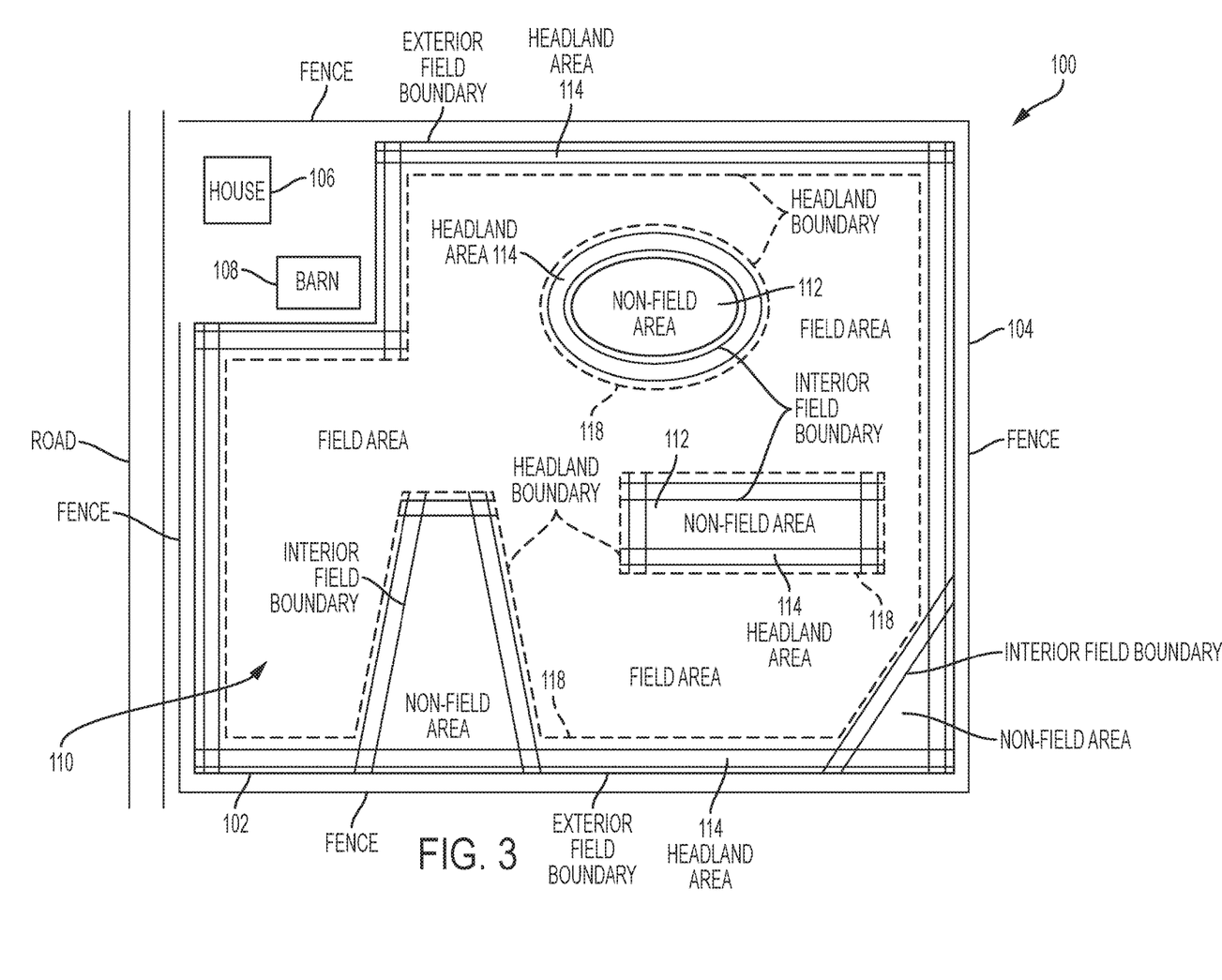
FIG. 3 is one example of a farm field defined by an operator for use with an automatic ground speed control system for a vehicle.

FIG. 3 is one example of a farm field 100 which illustrates a variety of paths and obstacles that a tractor working the field 100 encounters during a typical planting or cultivation. The layout of the field 100 is initially determined by the operator or other individual responsible for defining the field, including field dimensions, vehicle tracks, and areas of the field which are cultivated, where areas of the field are fallow, and areas of the field where the vehicle exits or enters the cultivated areas.

The field 100 includes an exterior field boundary 102 which is enclosed by a fence 104. A house 106 and barn 108 are located outside the fence 104. Within the fence 104, a working area 110 of the farm field 100 is available for planting while certain non-field areas 112 are not planted due to natural or man-made barriers, such as rocky areas or farm buildings. A headland area 114 is located between the exterior field boundary 102 and a headland boundary 118. The headland area 114 is not planted and provides for turning of the vehicle when necessary to begin another row (track) after finishing a row. Headland areas 114 are also located around the non-field areas 112.

Because of the irregular nature of the field area, the tractor must navigate the working area 110 at different speeds. For instance, tractor taking a straight line path across the working area must eventually turn to move to the next adjacent row. In some areas of the working area, the ground speed is established for a straight line path that is relatively free of impediments which could necessitate a slowing of the tractor. In other areas of the working area, however, shorter distances of travel, for instance between the headland boundary 102 and one of the non-field areas 112, are traveled by the tractor at a reduced speed since the distance between headland boundaries 118 is relatively close.

The farm field 100 is mapped by an operator and includes the boundaries and areas which are stored in the memory as a map. The ECU 60 in combination with the GPS system 56 determines the tracks taken by the work vehicle.

The automatic vehicle ground speed control system is configured to adjust vehicle speed by automatically increasing or slowing the speed of the tractor and implement where desired. In some areas along the path where the tractor must travel a tight curve, the turn is made at an appropriate speed determined by the ECU 60 to remain on a planned path, instead of overrunning the curve. Once the path becomes straight again, an automatic speed control algorithm accelerates the tractor to an operator established ground speed.

Figure 4:
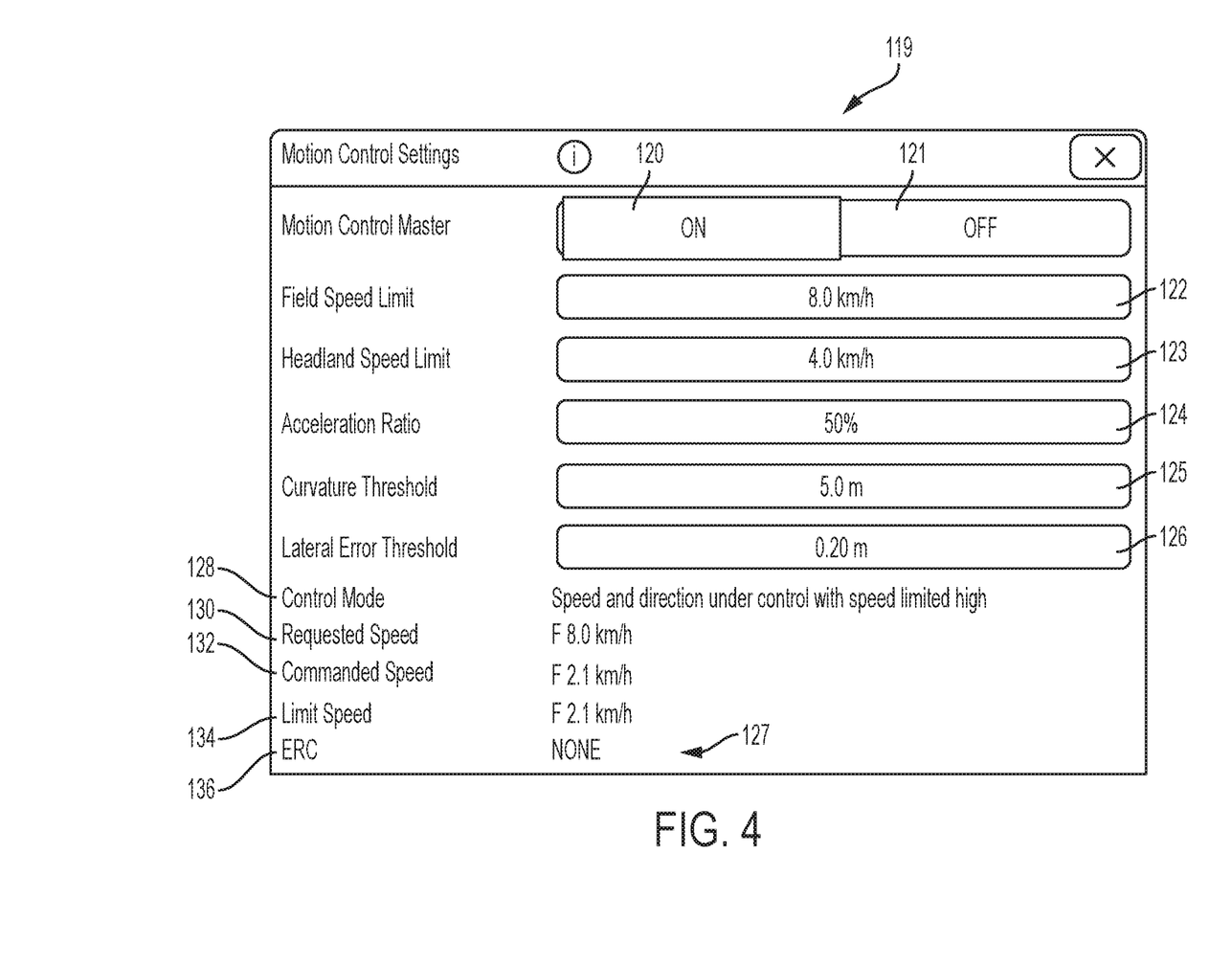
FIG. 4 is one embodiment of a user interface of an operator workstation.

To set an operator established ground speed, the operator accesses a user interface device 119 of the operator workstation 26, as illustrated in FIG. 4. The illustrated user interface device 119 is one of other user interfaces available at the operator workstation 26. In this embodiment, the user interface device 119, labeled as "motion control setting" is retrieved from a plurality of available screen displays. The user interface device 119 includes one or more control buttons, including an ON button 120 and an OFF button 121, and a plurality of user input data fields configured to accept data provided by the operator. The ON button and OFF button are a motion control master—on/off switch that determines whether the guidance computer sends wheel speed and direction requests to the tractor. In this embodiment, an ON control button engages the motion control settings for the vehicle, and the OFF button turns off the motion control settings of the vehicle such that the vehicle is operated by manual control. The user input data fields include, but are not limited to, a field speed limit selector 122, a headland speed limit selector 123, an acceleration ratio selector 124, a curvature threshold 125, and a lateral error threshold selector 126. The lateral error threshold selector 126 is configured to receive a lateral error threshold value which indicates the amount of vehicle travel deviation is acceptable from a planned vehicle path. In other embodiments, the user interface device 119 includes but is not limited to a general purpose computer, a laptop computer, and a mobile device such as cellular phone.

The field speed limit is a maximum wheel speed request entered by the operator that establishes the maximum wheel speed used by the tractor when the tractor and implement are on the 'working area' area (not on the headland). The headland speed limit is a maximum wheel speed request entered by the operator that establishes maximum wheel speed of the tractor when operating in the 'headland' area. The acceleration ratio is an operator preference of 1-100% of max acceleration of the tractor (approximately 1 m/s$^2$), used to ramp wheel speed requests up or down. This value is an operator defined acceleration and deceleration rate. The curvature threshold is a value which identifies a curvature value used to establish a vehicle speed for a future path segment. When the future path segment has a radius of curvature less than this value, then the speed of the tractor is set to the established vehicle using the curvature threshold for that curvature just as the vehicle reaches that segment. The lateral error threshold is a value that should the current lateral error exceeds this value, the wheel speed requests are reduced, or ramped down, until the lateral error stabilizes, after which the wheel speed requests are increased, or ramped back, up to the desired value. In one or more embodiments, the ramping up or the ramping down is one of a linear or non-linear increase or decrease of the vehicle speed.

The Headland Speed Limit is set to a value selected by the operator for the vehicle to travel when moving through the headland area of FIG. 3. In both of these speed limits, the ECU 60 is configured to include a predetermined maximum speed for each setting such that the operator cannot input a speed limit value which exceeds the predetermined maximum speed. The Acceleration Ratio is set by the operator to a percentage of a maximum acceleration value. The maximum acceleration value is value of acceleration which the vehicle cannot exceed under normal conditions. The Acceleration Ratio, therefore, enables the operator to establish an acceleration which the operator prefers. The Curvature Threshold is set by the operator to establish a minimum curve of a path to be taken by the vehicle when turning, for instance from one track (a first crop row) to another track (a second crop row) adjacent to the first crop row. In one or more embodiments, the curvature threshold is defined as a radius of a circle, a segment of which defines the path to be taken by the vehicle. The Lateral Error Threshold is set by the operator to indicate an amount of acceptable deviation from a path being taken by the vehicle as it moves through the working field area and/or the headland area. In one or more embodiments, data is entered into the data fields 122, 123, 124, 125, and 126 using direct types of input mechanisms, including direct input of a value using a keypad, a pulldown menu or list, or by a slider which is configured to move between a lower limit and an upper limit of the values being selected.

The user interface 119 further includes a display portion 127 which displays user selections or output modes of data including a control mode 128 and a requested speed 130. The control mode 128 indicates one or more of a plurality of modes, which are either preset at the ECU 60, or which are selected by the operator. The control mode indicates whether the guidance computer is in control or not in control of wheel speed, and whether the guidance computer is limited by the operator drive lever settings (guidance computer wheel speed request is limited by operator drive lever and throttle setting in the tractor). In the illustrated embodiment, the control mode is set such that both the speed and direction are being controlled with the speed being limited to a high value, or upper limit. In another embodiment, the control mode is set to a speed limit which includes limits at both a low value and a high value. The requested speed displays the current wheel speed request from guidance computer to tractor.

The display portion 127 of the user interface 120, in different embodiments, further displays a commanded speed 132 and a limit speed 134. The commanded speed 132 is a current wheel speed the tractor is being commanded to move by the transmission. The current maximum speed is the speed at which the tractor is allowed to travel based on drive lever and/or throttle settings. The limit speed is a speed set by the control system and indicates the fastest speed at which the vehicle travels. This limit speed is the current maximum speed the tractor is allowed to travel based on drive lever and throttle settings. An ERC (exit reason code) 136 displays a diagnostic code indicative of different types of modes, including fault modes, which indicate a mode or operator or why the vehicle is no longer operating according to the vehicle's preferred operating conditions.

Figure 5:
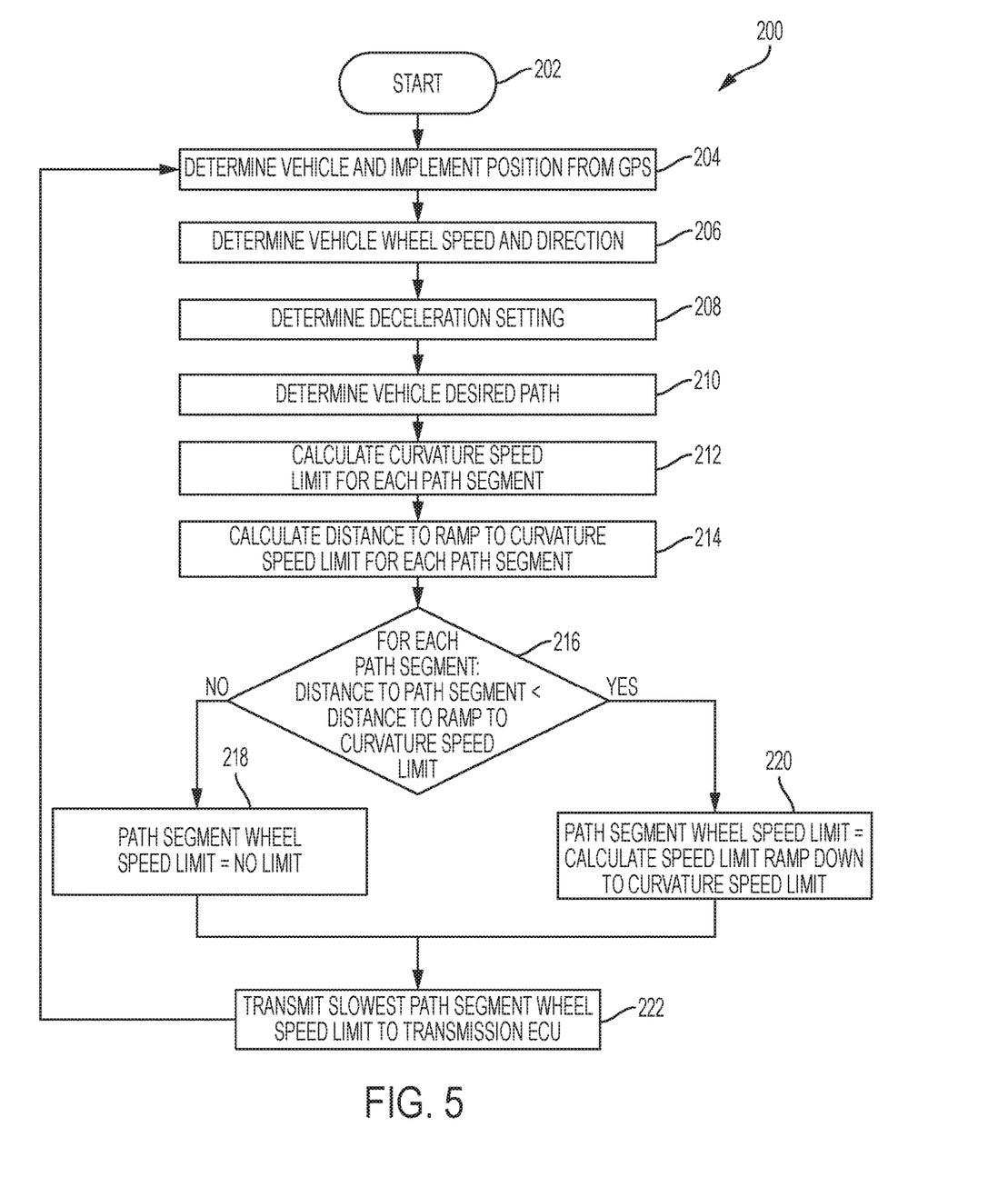
FIG. 5 is one embodiment of a process block diagram of a process performed by the control system of FIG. 2 to determine vehicle speed.

The ECU 60 is programmed according to a process block diagram 200 of FIG. 5. The process begins at start block 202 after which the ECU 60 determines the vehicle and implement position from the GPS system 56 at block 204. Once determined, the ECU 60 determines vehicle wheel speed and direction at block 206. In addition, the ECU 60 determines the vehicle deceleration setting at block 208 and the desired vehicle path at block 210. Once these values are determined, the ECU 60 calculates a curvature speed limit for each segment of the upcoming path at block 212. In one or more embodiments, the acceleration setting is the same as the deceleration setting of the acceleration setting is different than the deceleration setting. If different, in one embodiment the user interface device 119 includes a control buttons for setting a value for deceleration. Both are configured to be set by the operator.

As described with respect to FIG. 3, the field layout is known and the intended paths of the vehicle and implement, or vehicle only, are known along the straight line paths being taken through the field area. The curvature speed limit is therefore calculated based on a transition between one row or track to the next row or track, taking into account the current vehicle direction and wheel speed. In addition, a speed limit is determined for each path segment of a turn, where a turn is defined to include multiple straight line segments which when connected approximate the curved path being taken. For instance, if the turn is determined to be a semi-circle connecting one track to the next, each of the multiple straight line segments of the path have a determined speed. As used herein, the term "vehicle" is used to describe a vehicle without a separate implement, such as a self-propelled combine harvester, or a vehicle pulling or pushing an implement.

Once the curvature speed limit is determined for each path segment, the ECU 60 calculates the distance required to decrease (ramp down) to the curvature speed limit for each path segment of the entire turn at block 214. Once the distance to each upcoming path segment is known, it is determined at block 216 (or each path segment which of the path segments), if any, require a ramp down and which of those path segments requiring a ramp down have the lowest speed. This calculation is made for each path segment by determining whether the distance to the path segment is less than the distance to ramp to the curvature speed limit. If it is determined at block 216, that none of the distances to each of the path segments is greater than the distance to ramp to curvature speed limit, then it is determined at block 218 that the path segment wheel speed limit, does not need to be adjusted, i.e. there is no speed limit to enforce. If, however, it is determined that one or more of the distances to each of the path segments is less than the distance to ramp to curvature speed limit, then at block 220 a path segment wheel speed limit is calculated. The path segment wheel speed limit is calculated for each of the path segments that satisfies the determination of block 216 to determine a ramp down speed to achieve the curvature speed limit.

After the determination of speeds is made for each segment at block 220, the slowest path segment is transmitted to the ECU 60 at block 222. This value is provided by either the value of block 218 or the value of block 220. The slowest path segment is stored in the memory 72 and is used throughout the turn to maintain the speed of the tractor and implement at the slowest path segment speed for each of the segments. In one embodiment, the lowest speed value is determined each time a new curved path segment is anticipated.

Figure 6:
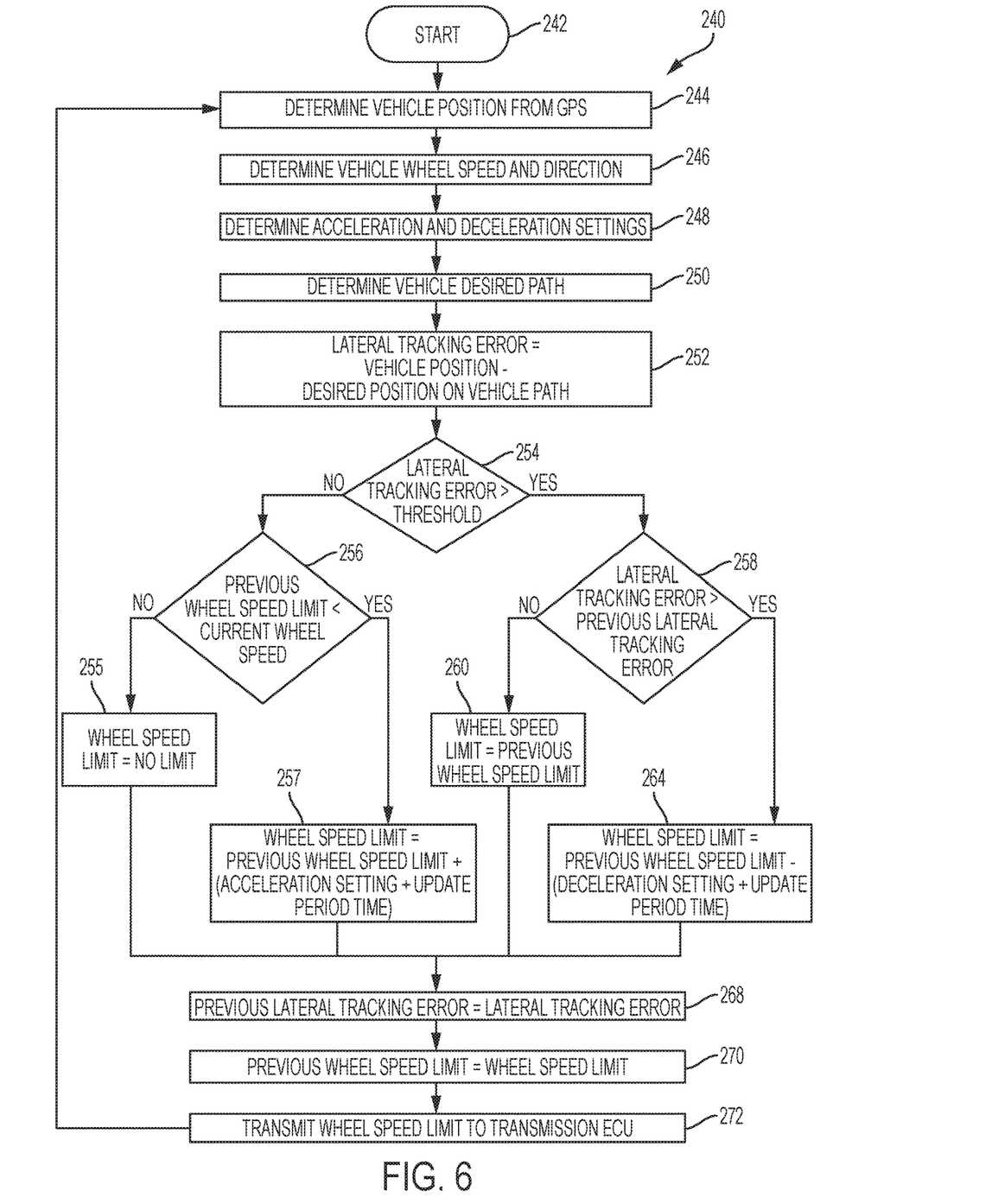
FIG. 6 is another embodiment of a process block diagram of a process performed by the control system of FIG. 2 to determine vehicle speed.

The automatic ground speed control system is further configured to reduce the speed of the tractor and implement automatically whenever the lateral tracking error of the tractor or implement exceeds an operator provided value or a predefined value as illustrated in a process block diagram 240 of FIG. 6 which begins at a start block 242. By automatically reducing the vehicle speed, the tractor is able to more quickly return to the intended track or curved path, which improves production efficiencies. Once the tracking error returns to the tracking error value as a result of the decreasing speed, the automatic speed control algorithm is configured to accelerate the tractor back up to the operator set maximum ground speed.

Once started, the ECU 60 determines a vehicle position from the GPS 56 at block 244 and determines vehicle wheel speed and direction at block 246. Acceleration and deceleration settings are determined at block 248 and a desired path of the vehicle is determines at block 260. Using the values determined at blocks 244 and 246, which are stored in memory, a lateral tracking error is determined at block 252 which is equivalent to the current vehicle position minus the desired position of the vehicle with respect to the predetermined vehicle path. Using the lateral error threshold illustrated in FIG. 4, a determination is made at block 254 to determine if the lateral tracking error is greater than the lateral error threshold. If the lateral tracking error is not greater than the threshold, then at block 256 it is determined whether the previous wheel speed limit is less than the current wheel speed. If not less than, the wheel speed limit is unchanged at block 255, i.e. no limit is provided by the system. If yes, however, the wheel speed limit is set equal to the previous wheel speed limit plus the result of the acceleration setting times the updated period time at block 257. The update period time is based on the software update time, such that the wheel speed limit is updated every period time to provide a relatively linear change in speed of the vehicle.

If the result of the comparison at block 254 is yes, then it is determined at block 258 whether the lateral tracking error is greater than the previous lateral tracking error. If no, the wheel speed limit is set equal to the previous wheel speed limit at block 260. If yes, the wheel speed limit is set equal to the previous wheel speed limit minus the result of multiplying the deceleration setting by the update period time at block 264. As described with respect to block 257, the wheel speed limit is adjusted linearly by changing the speed linearly every time the software makes a calculation.

In another embodiment, determination made at block 258 is not made and the process proceeds directly block 268.

Using wheel speed limit determined at one of the blocks 255, 257, 260, and 264, the previous lateral tracking error is set equal to the lateral tracking error at block 268. At block 270, a new lateral tracking error is determined and the previous wheel speed limit is set equal to a current wheel speed limit value. Once determined at block 270, the determined wheel speed limit is transmitted to the transmission ECU 62 either through the ECU 60 or directly to the transmission ECU 62 at block 272.

Figure 7:
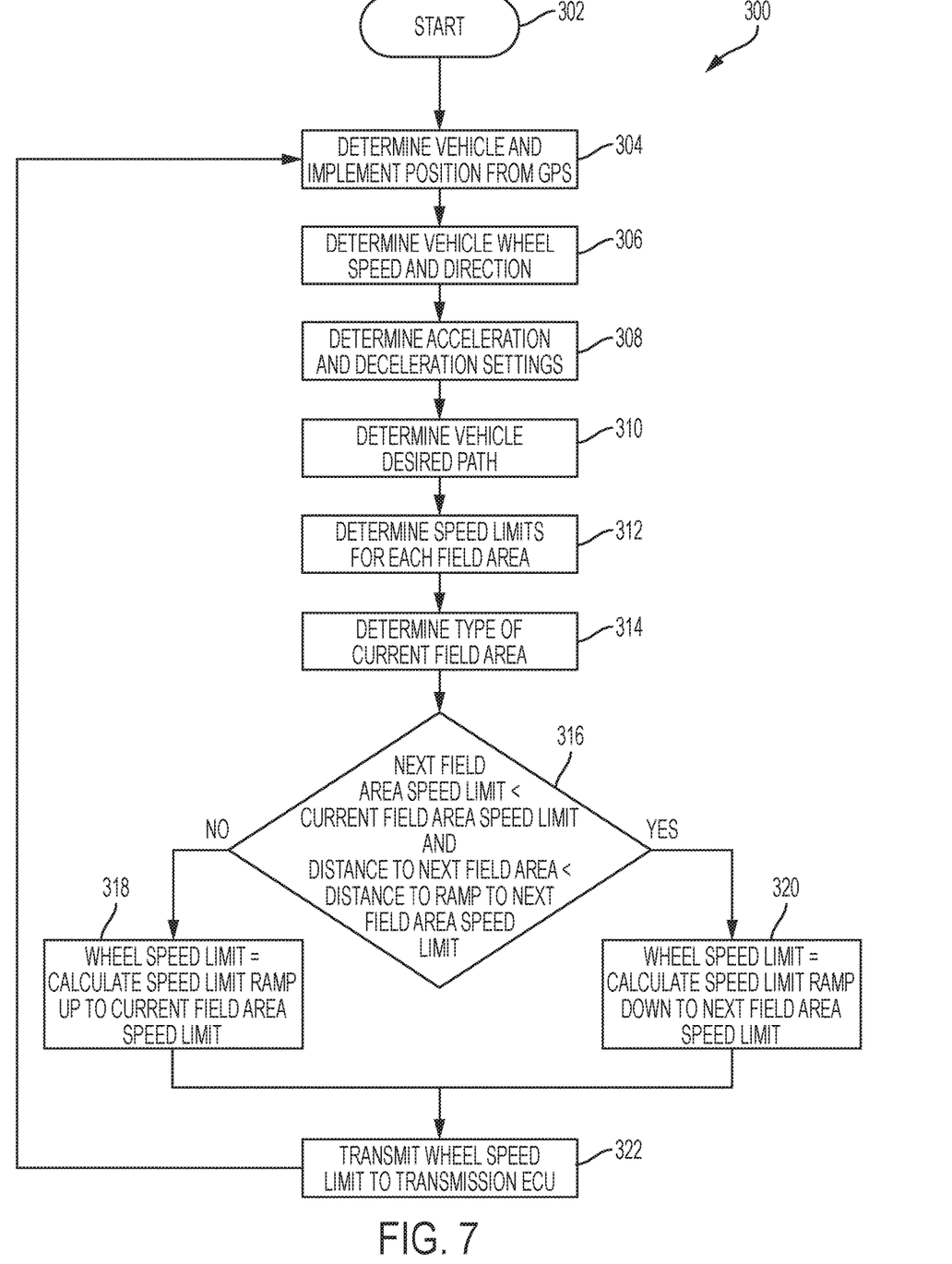
FIG. 7 is another embodiment of a process block diagram of a process performed by the control system of FIG. 2 to determine vehicle speed.

The automatic ground speed control system is further configured to automatically switch between the operator maximum ground speed limits of the field speed limit and the headland speed limit based on the location of the tractor and implement in the field as illustrated in FIG. 7. Generally different speed limits are used for the working area of the field verses the headland turn around area as previously described. The system automatically looks ahead while moving along a current path for the next area to be entered by the tractor. This slows the tractor down before entering that area, if the area being entered has a slower speed limit. Conversely the system waits to speed up until the tractor and implement have totally entered the new area if the new area's speed limit is faster than the current area's speed limit.

A process diagram 300 of FIG. 7 begins at start block 302 after which the vehicle and implement position are determined from the GPS 56 at block 304 and the vehicle wheel speed and direction are determined at block 306. In addition, the acceleration and deceleration settings and the vehicle desired path are determined respectively at blocks 308 and 310. The previously defined speed limits for each field area are determined at block 312 and the type of current field area is determined at block 314. Once these values have been determined and stored in memory, a determination is made at block 316 to determine whether the next field area speed limit is less than the current field area speed limit and whether the distance to the next field area is less than the distance necessary to decrease the speed of the vehicle (ramp down the speed) to the next field area speed limit. If no, the wheel speed limit is set equal to a calculation made by the ECU 60 which determines a value for a speed limit ramp up to the current field area speed limit at block 318. If no, the wheel speed limit is set equal to a calculation made by the ECU 60 which determines a value for the speed limit which ramps down to the next field area speed limit at block 320. Once the values have been determined at either the block 318 or the block 320, the determined value of the ramp speed up of down is transmitted directly or through the ECU 60 to the transmission ECU 62 at block 322.

Figure 8:
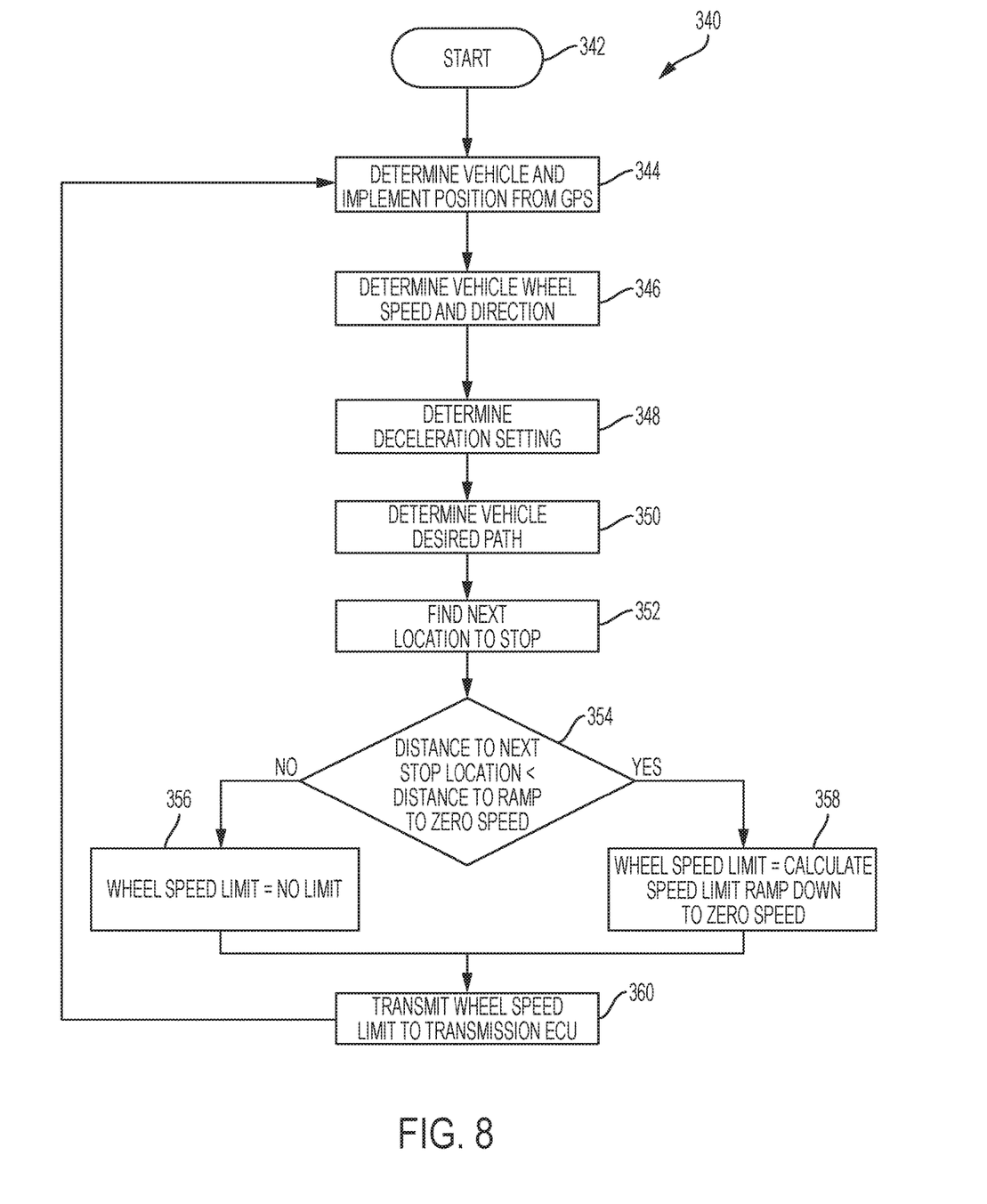
FIG. 8 is another embodiment of a process block diagram of a process performed by the control system of FIG. 2 to determine vehicle speed.

The automatic ground speed control system is further configured to automatically stop and then start motion in the opposite direction when the planned path of the tractor requires a direction change as illustrated in FIG. 8. For example, the stop and start motion occurs when the tractor needs to execute a three-point turn at the end of a field row. Three point turns are generally used to move between adjacent tracks where the area of area of the headland is limited. A first curved path is followed which generally places the vehicle longitudinal axis at approximately 90 degrees to the track. A second path involves reversing the direction of the tractor to back the tractor up while in the headland area to a position sufficiently distanced from the next track, such that a third path, which is curved, is taken to align the longitudinal axis of the tractor with the new row.

The system determines the end of the first forward direction segment and brings the tractor to a stop. Then once the operator shifts a direction drive lever to reverse the vehicle, the system starts a reverse motion until the end of the reverse segment is reached, where the tractor is stopped again. The process repeats to start forward motion of the tractor to a third segment that completes the three point turn. The system requires that the operator changes the drive lever direction position manually before motion in the new direction is started. A tractor entering the headland area to start a three point turn, "looks ahead" or determines the correct place to stop the tractor and will optimally reduce the speed to zero before arriving at a stop location using the deceleration setting.

In the first segment, the tractor arrives at the stop location that ends the first segment and ramps up a reverse motion while looking ahead for next location to stop. The tractor then arrives at a second stop location and ramps up forward motion. Once the tractor enters the new row or track, the tractor has completed the three point turn and continues to look ahead for next place to stop at the other end of the field.

As seen in FIG. 8, a direction and stop control process diagram 340 begins at step 342 after which the vehicle and implement position is determined from the GPS 56 at block 344 and the vehicle wheel speed and direction is determined at block 346. The deceleration setting and the vehicle desired path settings are determined respectively at blocks 348 and 350. Once the vehicle desired path is determined, the next location to stop is determined at block 352. Having these values, the ECU 60 determines whether the distance to the next stop location is less than the distance necessary to ramp to zero speed at block 354. If not, the wheel speed limit is not changed at block 356. If yes, however, the wheel speed limit is set equal to the calculated speed limit which ramps the speed down to zero at block 358. Once the value of the wheel speed limit has been determined, either at block 356 or 358, the determined wheel speed limit is transmitted to the transmission ECU 62 as previously described at block 360.

As described herein, each of the work vehicle speed control processes of FIGS. 5, 6, 7, and 8 is one of a reactive or a proactive wheel speed limiting process. A reactive wheel speed limiting process that takes as input the current lateral path tracking error of the vehicle relative to its desired path is described in FIG. 5. A proactive wheel speed limiting algorithm that takes as input the curvature of the upcoming planned path segments is described in FIG. 6. A proactive wheel speed limiting algorithm that takes as input the current location of the tractor and implement in the field and limits to the operator defined speed limit for that area is described in FIG. 7. A proactive wheel speed limiting algorithm that takes as input the upcoming planned path segments and their associated direction of travel is described in FIG. 8.

Each of the described work vehicle speed control processes of FIGS. 5, 6, 7, and 8, in different embodiments, are used either alone or in combination with any one, some of, or all of the other speed control processes. In one embodiment, the speed being generated by each of the reactive and proactive speed control is determined and the lesser value is used to set the vehicle speed. This vehicle wheel speed limit is then applied to the vehicle's current wheel speed command if the calculated speed limit is less than the current operator selected wheel set to the vehicle to slow down to the new speed limit.

While exemplary embodiments incorporating the principles of the present disclosure have been described hereinabove, the present disclosure is not limited to the described embodiments. Instead, this application is intended to cover any variations, uses, or adaptations of the disclosure using its general principles. In addition, while the terms greater than and less than have been used in making comparison, it is understood that either of the less than or greater than determines can include the determination of being equal to a value. Further, this application is intended to cover such departures from the present disclosure as come within known or customary practice in the art to which this disclosure pertains and which fall within the limits of the appended claims.

The invention claimed is:

1. An automatic ground speed control system for a work vehicle having a prime mover supplying torque to a ground engaging traction device and an electronic control unit (ECU), the control system comprising:
 a speed sensor generating a vehicle speed signal, the speed sensor operatively connected to the ECU;
 a traction device angle sensor generating an angle signal which represents an angle of the traction device with respect to an axis of the work vehicle, the traction device angle sensor operatively connected to the ECU; and
 a vehicle guidance system generating a vehicle position signal, wherein the ECU determines a direction of the vehicle position signal and further determines a ground speed limit of the work vehicle based on the direction of the work vehicle.

2. The automatic ground speed control system of claim 1, wherein the ECU determines the ground speed limit of the vehicle based on at least one of: i) a tracking error of the vehicle relative to the vehicle position signal; ii) a planned curved vehicle path; iii) a planned location of the vehicle within a defined portion of a field; and iv) a planned path segment and an associated change in direction of travel of the work vehicle.

3. The automatic ground speed control system of claim 2 wherein the tracking error comprises a lateral tracking error of the work vehicle with respect to a planned straight or curved line track.

4. The automatic ground speed control system of claim 3 wherein the ground speed limit of the vehicle is reduced based on the lateral tracking error exceeding a predefined error tolerance value or dynamically calculated optimal error value.

5. The automatic ground speed control system of claim 4 wherein the optimal error tolerance value is dynamically calculated by the ECU.

6. The automatic ground speed control system of claim 2 wherein the ground speed limit of the vehicle traveling along the planned curved vehicle path is reduced based on a current work vehicle speed exceeding a predefined speed for traveling along the planned curved vehicle path.

7. The automatic speed control system of claim 6 wherein the predefined speed for traveling along the planned curved vehicle path is provided to the ECU by an operator accessible input device.

8. The automatic ground speed control system of claim 2 wherein the ground speed limit of the vehicle is reduced in the planned location of the work vehicle within the defined portion of the field based on a current work vehicle speed exceeding a predefined speed for traveling within the defined portion of the field.

9. The automatic speed control system of claim 8 wherein the predefined speed limit for traveling within the defined portion of the field is provided to the ECU by an operator accessible input device.

10. The automatic speed control system of claim 2 wherein the ground speed limit is reduced with respect to the planned path segment based on the associated change in direction, wherein the associated change in direction requires a work vehicle stop or does not require a work vehicle stop before changing direction.

11. The automatic speed control system of claim 10 wherein the work vehicle change in direction location is optimally calculated by the ECU.

12. The automatic speed control system of claim 11 wherein the operator accessible device includes a direction drive shift lever or other direction drive input device.

13. An automatic ground speed control system for a work vehicle having a steerable wheel and a prime mover supplying torque to a ground engaging traction device, the control system comprising:
a speed sensor generating a vehicle speed signal;
a traction device angle sensor generating an angle signal which represents an angle of the traction device with respect to an axis of the work vehicle;
a vehicle guidance system generating a vehicle position signal;
a user interface device configured to receive one or more input values provided by an operator; and
control circuitry operatively connected to the speed sensor, the traction device angle sensor, the vehicle guidance system, and the user interface device, wherein the control circuitry includes a processor and a memory, wherein the memory is configured to store program instructions and the processor is configured to execute the stored program instructions to:
determine the input value received by the user interface device; and
determine a ground speed limit of the work vehicle based on a determined direction of the work vehicle and the determined input value.

14. The automatic ground speed control system of claim 13 wherein the processor is further configured to execute stored program instruction to:
determine the ground speed limit of the vehicle based on at least one of: i) a lateral tracking error of the vehicle relative to the vehicle position signal; ii) a planned curved vehicle path; iii) a planned location of the vehicle within a defined portion of a field; and iv) a planned path segment and an associated change in direction of travel of the work vehicle.

15. The automatic ground speed control system of claim 14 wherein the input value received by the user interface device includes one of: i) a predefined error value for the lateral tracking error; ii) a curvature threshold value; iii) field work area speed limit; and iv) a field headland speed limit.

16. The automatic ground speed control system of claim 15 wherein the processor is further configured to execute stored program instruction to:
reduce the ground speed limit of the vehicle based on one of: i) the lateral tracking error exceeding the predefined error tolerance value; ii) the curvature threshold value; iii) the current work vehicle speed exceeding the field work area speed limit; and iv) the current work vehicle speed exceeding the field headland speed limit.

17. The automated speed control system of claim 16 wherein the processor is further configured to execute stored program instruction to:
reduce the ground speed limit with respect to the planned path segment based on a change in direction.

18. A method of automatically controlling the ground speed of a work vehicle moving through a field having a working area and a headland area, the method comprising:
moving the vehicle at a defined ground speed limit along a predetermined straight vehicle path located in the working area;
reducing the defined ground speed limit based on a deviation of the work vehicle from the predetermined straight vehicle path when the deviation exceeds a predefined lateral error threshold;
moving the vehicle along a curved path defined in the headland area; and
reducing the defined ground speed limit based on a predefined curvature threshold value when the defined ground speed limit exceeds the associated predefined curvature threshold value.

19. The method of claim 18 further comprising:
increasing the reduced defined ground seed limit when the deviation from the predetermined straight vehicle path no longer exceeds the predefined lateral error threshold; and
adjusting the speed of the work vehicle based on the location of work vehicle within two or more different areas of the field including the working area and the headland area.

20. The method of claim 19 further comprising:
reducing the ground speed with respect to a planned path segment based on a change in direction.

* * * * *